USO09169929B2

(12) United States Patent
Kellar et al.

(10) Patent No.: US 9,169,929 B2
(45) Date of Patent: Oct. 27, 2015

(54) CONFORMAL WEAR-RESISTANT SEAL

(71) Applicant: Little Engine, LLC, Gastonia, NC (US)

(72) Inventors: Franz W. Kellar, Gastonia, NC (US); Harold Lloyd Crowder, Jr., Concord, NC (US); Scott M. Duquette, Clemmons, NC (US)

(73) Assignee: Little Engine, LLC, Gastonia, NC (US)

( * ) Notice: Subject to any disclaimer, the term of this patent is extended or adjusted under 35 U.S.C. 154(b) by 0 days.

(21) Appl. No.: 13/969,396

(22) Filed: Aug. 16, 2013

(65) Prior Publication Data

US 2014/0265144 A1    Sep. 18, 2014

Related U.S. Application Data

(60) Provisional application No. 61/799,410, filed on Mar. 15, 2013.

(51) Int. Cl.
F16J 15/32   (2006.01)
F16J 15/34   (2006.01)

(52) U.S. Cl.
CPC .......... *F16J 15/3204* (2013.01); *F16J 15/3244* (2013.01); *F16J 15/3284* (2013.01); *F16J 15/3456* (2013.01)

(58) Field of Classification Search
CPC ... F16J 15/324; F16J 15/3204; F16J 15/3232; F16J 15/3268
USPC .................................. 277/549, 560, 567, 572
See application file for complete search history.

(56) References Cited

U.S. PATENT DOCUMENTS 1,433,478 A   10/1922 Rogatchoff
1,580,462 A    4/1926 Woodruff
(Continued)

FOREIGN PATENT DOCUMENTS

CN   20101779267 U   3/2011
CN   20102003325 A   3/2013
(Continued)

OTHER PUBLICATIONS

Wilkinson, D. H., et al, Dynamic shaft seals (Dynamic shaft seal types for high speed continuous shaft rotation, considering service life, failure modes and materials selection), Machine Design 45 (Sep. 13, 1973), pp. 20-29, 32. Palmyra, New York.
(Continued)

*Primary Examiner* — Gilbert Lee
(74) *Attorney, Agent, or Firm* — Trego, Hines & Ladenheim, PLLC

(57) ABSTRACT

A seal apparatus includes: (a) first and second machine elements defining a sealing interface between two zones subject to different fluid pressures, a boundary of which lies between the two elements; (b) a seal comprising rigid material carried by the first machine element and having an annular lip defining a first contact surface; (c) a second contact surface comprising rigid material, defined by the second machine element; (c) wherein both contact surfaces are wear resistant, and the first and second contact surfaces bear directly against each other, so as to seal against fluid leakage between the first and second zones, while allowing relative sliding motion between the first and second contact surfaces; and (d) wherein the seal is configured to allow the lip to deform elastically and permit the first contact surface to conform in a regular or irregular shape to the second contact surface.

15 Claims, 16 Drawing Sheets

(56) References Cited

U.S. PATENT DOCUMENTS

| | | | |
|---|---|---|---|
| 2,271,777 A | 4/1939 | Nathan | |
| 2,993,711 A | 9/1956 | Peras | |
| 3,128,105 A | 4/1964 | Liebig | |
| 3,455,562 A | 7/1969 | Burtis | |
| 3,713,659 A | 1/1973 | Derman et al. | |
| 3,761,101 A | 9/1973 | Good et al. | |
| 3,773,338 A * | 11/1973 | Fidler et al. | 277/370 |
| 3,995,868 A * | 12/1976 | Smith | 277/560 |
| 4,018,461 A | 4/1977 | Bram | |
| 4,072,245 A | 2/1978 | Sloan, Jr. | |
| 4,102,538 A | 7/1978 | Bertin | |
| 4,283,064 A | 8/1981 | Staab et al. | |
| 4,427,205 A * | 1/1984 | Holzer et al. | 277/559 |
| 4,469,335 A * | 9/1984 | Moore | 277/648 |
| 4,494,759 A | 1/1985 | Kieffer | |
| 4,560,177 A | 12/1985 | Riley, Jr. | |
| 4,593,916 A | 6/1986 | Laulhe et al. | |
| 4,641,858 A | 2/1987 | Roux | |
| 4,747,606 A | 5/1988 | Jennings | |
| 4,768,278 A | 9/1988 | Pickering et al. | |
| 4,822,059 A | 4/1989 | Shimasaki et al. | |
| 4,844,485 A | 7/1989 | Antonini et al. | |
| 4,892,116 A * | 1/1990 | Grasseschi | 137/360 |
| 4,906,009 A * | 3/1990 | Saitoh | 277/349 |
| 4,968,044 A | 11/1990 | Petrak | |
| 5,042,365 A | 8/1991 | Rosman | |
| 5,172,921 A | 12/1992 | Stenlund | |
| 5,499,824 A | 3/1996 | Salant | |
| 5,639,098 A * | 6/1997 | MacDonald | 277/391 |
| 5,791,658 A | 8/1998 | Johnston | |
| 6,032,958 A * | 3/2000 | Fowler | 277/337 |
| 6,056,293 A | 5/2000 | Visconti | |
| 6,164,663 A | 12/2000 | Turner | |
| 6,315,302 B1 | 11/2001 | Conroy et al. | |
| 6,557,857 B1 * | 5/2003 | Goodman | 277/549 |
| 6,561,521 B2 * | 5/2003 | Janoff et al. | 277/603 |
| 6,926,283 B2 * | 8/2005 | Janoff et al. | 277/603 |
| 7,828,299 B2 * | 11/2010 | van Schoor et al. | 277/551 |
| 8,091,831 B2 * | 1/2012 | Roming | 244/129.5 |
| 8,181,971 B2 * | 5/2012 | Uhrner et al. | 277/559 |
| 8,419,020 B2 * | 4/2013 | van Schoor et al. | 277/553 |
| 2003/0155717 A1 * | 8/2003 | Zheng | 277/500 |
| 2003/0173746 A1 * | 9/2003 | Ramsay | 277/549 |
| 2004/0032088 A1 * | 2/2004 | Janoff et al. | 277/322 |
| 2006/0214380 A1 * | 9/2006 | Dietle et al. | 277/559 |
| 2009/0072489 A1 * | 3/2009 | Uhrner et al. | 277/549 |
| 2010/0025939 A1 * | 2/2010 | Horton et al. | 277/570 |
| 2010/0201077 A1 * | 8/2010 | Uhrner et al. | 277/549 |
| 2011/0024990 A1 * | 2/2011 | Berdichevsky | 277/559 |
| 2011/0166671 A1 | 7/2011 | Kellar et al. | |
| 2013/0020799 A1 * | 1/2013 | Silveira et al. | 285/351 |

FOREIGN PATENT DOCUMENTS

| | | |
|---|---|---|
| DE | 102008039809 A1 | 2/2010 |
| EP | 0641961 A1 | 3/1995 |
| GB | 926789 | 5/1963 |
| GB | 2212569 A | 7/1989 |
| JP | 2009257366 | 11/2009 |
| KR | 100252288 | 4/2000 |
| RU | 2132503 | 6/1999 |
| RU | 2265767 | 12/2005 |

OTHER PUBLICATIONS

Wheelock, E. A., High-Pressure Radial Lip Seals for Rotary and Reciprocating Applications, Lubrication Engineering, vol. 27, No. 6 (Jun. 1981), pp. 332-335. Morton Grove, Illinois.

Ochonski, Wlodzimierz, Application of Shape Memory Materials in Fluid Sealing Technology, Industrial Lubrication and Tribology, vol. 62/2 (2010), pp. 99-110, USA.

Foszcz, Joseph L ., Power Transmission: Dynamic Shaft Seals, Plant Engineering, vol. 44, No. 10 (May 24, 1990), pp. 52-58. Oak Brook, Illinois.

A. Biryukov, International Search Report for PCT/US2014/028240, Aug. 11, 2014, FIPS, Moscow, Russia.

* cited by examiner

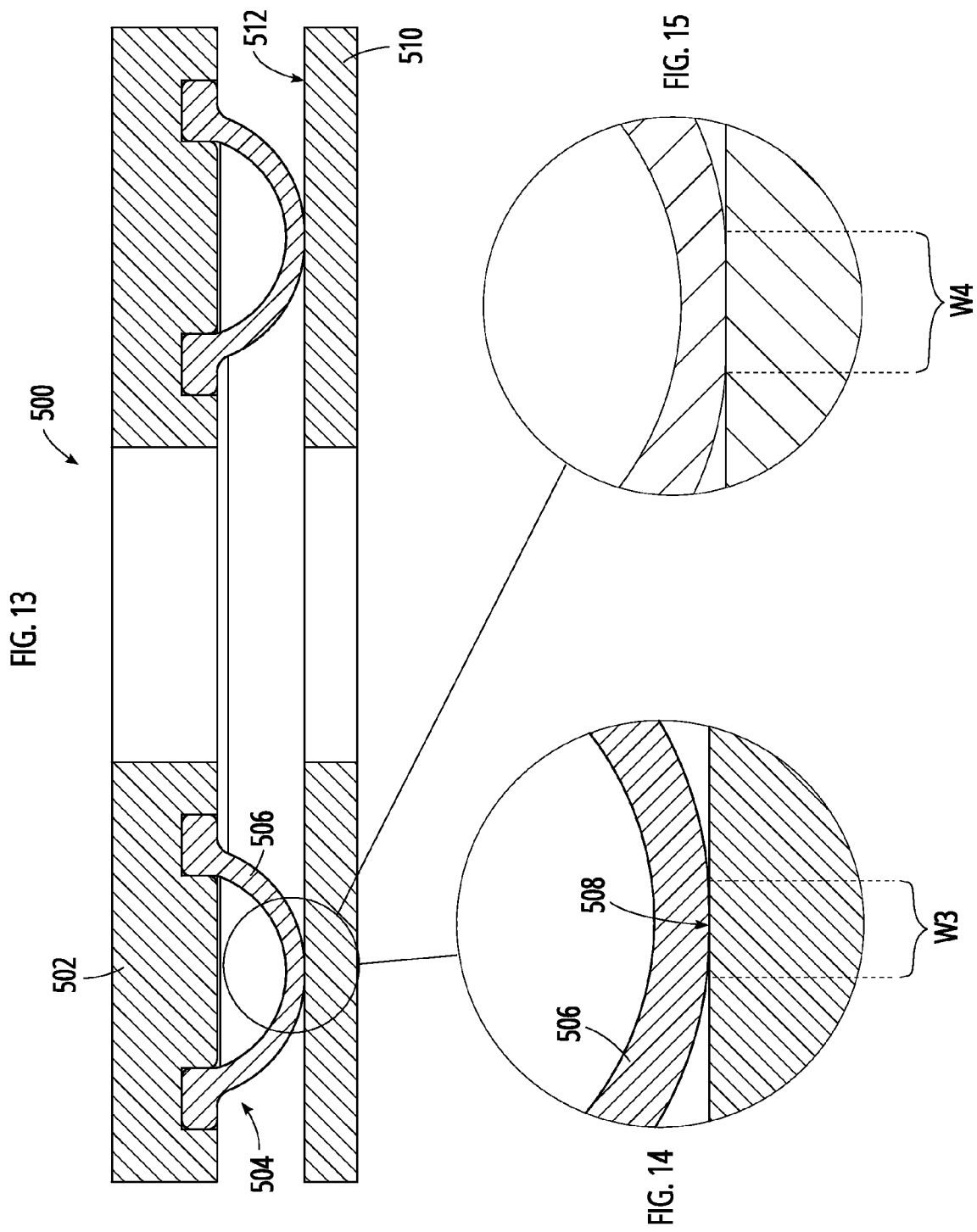

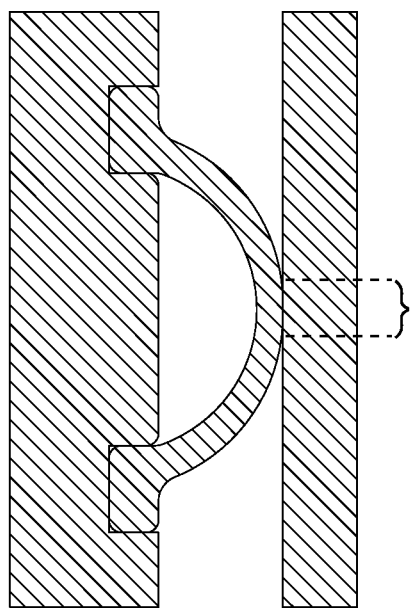
FIG. 16
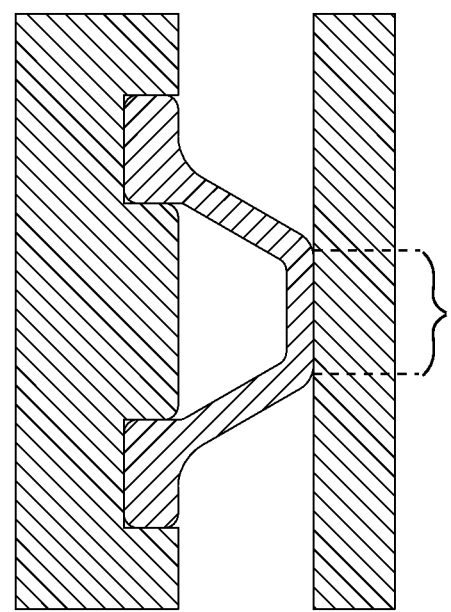
FIG. 17
FIG. 18

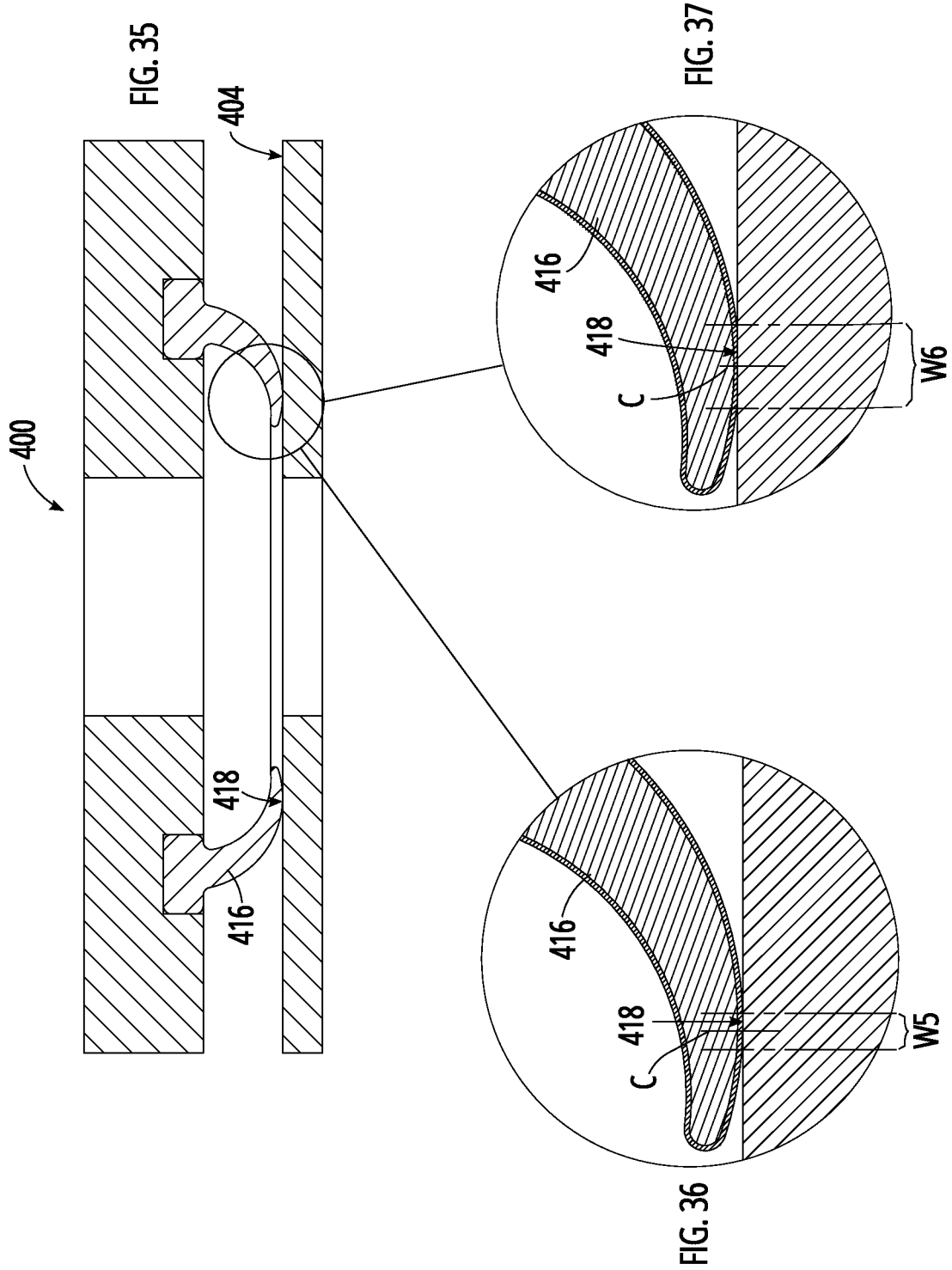

CONFORMAL WEAR-RESISTANT SEAL

BACKGROUND OF THE INVENTION

This invention relates generally to seals, and more particularly to fluid seals for use between two components which may move relative to each other.

Numerous types of mechanical assemblies require sealing between two components to prevent leakage of fluid (i.e. liquids or gases) therebetween.

Sealed assemblies between machine elements have previously consisted primarily of two or more relative "hard" components (e.g. metal or other hard material) sealed by a soft seal or packing (e.g. polymer, rope packing etc.)

It is desirable to employ a design using a hard member on a hard member seal (e.g. metals or ceramics), thus eliminating the polymer. Such a design is expected to have a longer service life and be suitable for harsh environments including for example high temperatures or pressures, or caustic or corrosive fluids.

Seals using two hard elements of conventional design will be, however, subject to rapid wear. First, a seal having one hard, rigid element on another will not be perfectly shaped to a nominal geometry. Such imperfections will result in points of high stress, thus causing localized wear. Furthermore, two hard elements would lack the resilient nature of a "soft" seal.

BRIEF SUMMARY OF THE INVENTION

These and other shortcomings of the prior art are addressed by the present invention, which provides a seal configuration having wear-resistant contacting surfaces with conformal properties.

According to one aspect of the invention, a seal apparatus includes: (a) first and second machine elements cooperatively defining a sealing interface between two zones which are subject to different fluid pressures, a boundary of which lies between the two elements; (b) a seal comprising a rigid material carried by the first machine element, the seal having an annular lip defining a first contact surface; (c) a second contact surface comprising a rigid material, defined by the second machine element; (c) wherein both contact surfaces are wear resistant, and wherein the first and second contact surfaces bear directly against each other, so as to seal against fluid leakage between the first and second zones, while allowing relative sliding motion between the first and second contact surfaces; and (d) wherein the seal is shaped and sized so as to allow the lip to deform elastically and permit the first contact surface to conform in an irregular shape to the second contact surface.

BRIEF DESCRIPTION OF THE DRAWINGS

The invention may be best understood by reference to the following description taken in conjunction with the accompanying drawing figures in which:

FIG. 13 is a cross-sectional view of an alternative seal assembly;

FIG. 14 is an enlarged view of a seal seen in FIG. 13, in a first condition;

FIG. 15 is an enlarged view of a seal seen in FIG. 15, in a second condition;

FIG. 16 is a cross-sectional view of a closed seal configuration;

FIG. 17 is a cross-sectional view of a closed seal configuration;

FIG. 18 is a cross-sectional view of a closed seal configuration;

FIG. 35 is a cross-sectional view of a seal assembly;

FIG. 36 is an enlarged view of a seal seen in FIG. 35, in a first condition;

FIG. 37 is an enlarged view of a seal seen in FIG. 35, in a second condition;

DETAILED DESCRIPTION OF THE INVENTION

Figure 1:
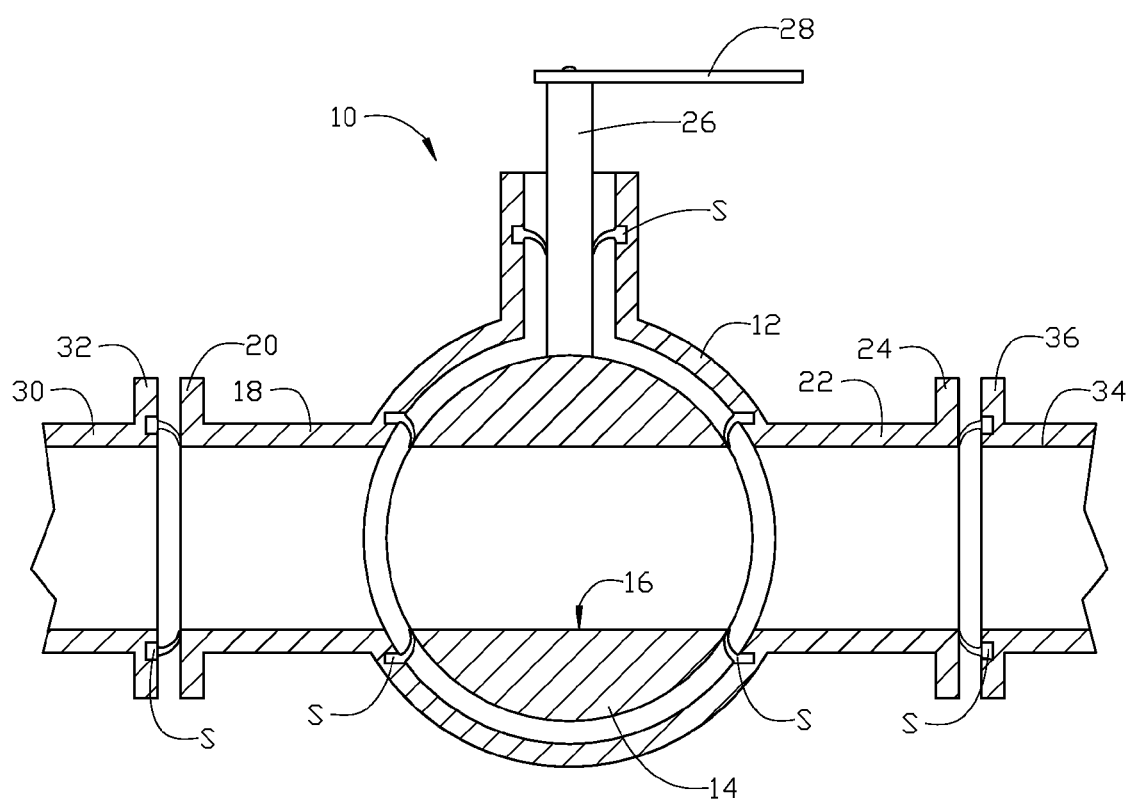
FIG. 1 is a schematic, cross-sectional view of a valve incorporating seals constructed in accordance with aspects of the present invention.

The present invention provides a specialized seal contact interface with a conformal or conformable seal member (the terms "conformal" and "conformable" may be used interchangeably herein). Generally, the seal member is flexible enough to allow elastic deformation and avoid localized load increases, but not so flexible as to risk plastic deformation, cracking and failure. In particular, the resilient member is designed such that the stress levels therein will be below the high-cycle fatigue endurance limit. As an example, the resilient member might be only about 10% to about 20% as stiff as a comparable solid member. It is also possible to construct the resilient member geometry with a variable stiffness, i.e. having a low effective spring rate for small deflections and a higher rate as the deflections increase, to avoid failure under sudden heavy loads.

As a general principle, the seal assembly of the present invention includes two mechanical members which require sealing against fluid leakage therebetween, and both of the members include wear-resistant contact surfaces. It will be understood that the principles described herein may be applied to any type of surfaces that require sealing therebetween. A seal is provided, which may be a separate component or integral to one of the members. The seal includes a wear-resistant contact surface that seals against the opposing contact surface. The structure of the seal is compliant. It is also noted that the seal assembly could include two seal lips which bear against each other to define a sealing interface.

The seal generally includes a protruding annular lip. The seal is constructed from a rigid material. As used here, the term "rigid" refers to a material which has a high stiffness or modulus of elasticity. Nonlimiting examples of rigid materials having appropriate stiffness for the purpose of the present invention include stainless steels, cobalt-chrome alloys, titanium, aluminum, and ceramics. By way of further example, materials such as polymers and elastomers would generally not be considered "rigid" for the purposes of the present invention. Generally, a rigid material should have a modulus of elasticity of about $0.5 \times 10^6$ psi or greater. The lip defines a wear-resistant contact surface. As used herein, the term "wear-resistant" refers to a surface which is resistant to surface material loss when placed under load with relative motion to another surface. Generally the wear coefficient of the wear-resistant surface should be lower than 1.0 e-5 mm$^3$/N-m (that is, $1\times10^{-5}$ cubic millimeter per Newton-meter). Nonlimiting examples of wear-resistant materials include known coatings such as STELLITE, tungsten carbide, titanium nitride, chrome plating, carbon thin films, and/or diamond-like carbon coatings. Such materials may be used as a face layer, coating, or film to impart the wear-resistant characteristic to the contact surface of the seal lip. Such coatings are referred to herein as "wear-resistant coatings." Optionally, the contact surface of the seal lip could comprise a substantially thicker face layer of a wear-resistant material such as ultra-high molecular weight polyethylene (UHMW-PE) or polyether ether ketone ("PEEK").

Nominally the two mating contact surfaces (i.e. seal and opposing surface) define a "ring" or "band" contact interface therebetween. In practice it is impossible to achieve surface profiles completely free of minor imperfections and variations. If the seal and the opposing member were both completely rigid, this would cause high Hertzian contact stresses and rapid wear. Accordingly, an important principle of the present invention is that the lip and thus the contact surface of the seal is conformable to the opposing contact surface.

As noted above, it is impossible in practice for either of the contact surfaces to be perfect surfaces (i.e. a perfect plane, sphere, or other curve or collection of curves). It is believed that in most cases that a defect such as a protrusion from the nominal contact surface of just 0.00127 mm (0.00005 in.), that is, 50 millionths of an inch, or larger, would be sufficient to cause fretting corrosion and failure of a metal-on-metal joint constructed to prior art standards. A defect may include a variance from a nominal surface shape as well as a discontinuity in the contact surface. Defects may arise through a variety of sources such as manufacturing, installation, and/or operating loads in the seal assembly. A seal having a prior art configuration and made from rigid material cannot conform to such defects through elastic deformation, and has a tendency to "bridge" across them instead.

Following the principles of the present invention, the lip of the seal can conform to the imperfect opposing contact surface and deflect in an irregular shape. In other words, in addition to any uniform deflection which may be present, the deflected shape of the lip can include one or more specific locations or portions that are deflected towards or away from the nominal free shape to a greater or lesser degree than the remainder of the lip. To achieve this controlled deflection, the lip is thin enough to permit bending under working loads, but not so thin as to allow material yield or fatigue cracking, or to exceed the endurance limit of the material. The deflection is opposed by the elasticity of the lip in bending, as well as the hoop stresses in the lip. The lip could also be designed to allow some controlled plastic deflection. As used herein, the term "conform" or "conformal" implies a level of flexibility typical of a polymeric or elastomeric material.

FIG. 1 illustrates a valve 10 incorporating seal assemblies of the present invention. The valve 10 includes a housing 12 which encloses a ball 14 having a bore 16 passing therethrough. The housing 12 includes an inlet passage 18 having a first end with a flange 20 and a second end that communicates with the bore 16 of the ball 14. The housing 12 also includes an outlet passage 22 having a first end with a flange 24 and a second end that communicates with the bore 16 of the ball 14. A rotatable stem 26 extends through the housing 12 and has an inner end coupled to the ball 14 and an outer end coupled to a handle 28. Each of the components of the valve 10 can be considered to be a "machine element."

An inlet pipe 30 is coupled to the inlet passage through a flange 32 which is coupled to flange 20. An outlet pipe 34 is coupled to the outlet passage through a flange 36 which is coupled to flange 24.

In operation, fluid under pressure is supplied through inlet pipe 30 and flows through the inlet passage 18 to the ball 16. In the illustrated position, fluid is free to flow through the bore 16, through the outlet passage 22 and then to the outlet pipe 34. In a closed position, the ball 16 would be rotated 90 degrees about an axis parallel to the stem 26, blocking off flow between the inlet and outlet passages 18 and 22.

The valve 10 and connected pipes 30 and 34 thus define several sealing interfaces or sealing boundaries. As used herein, the term "sealing interface" refers to the boundary between two areas or zones which are subject to different fluid pressure or flow conditions. For example, the interior of the inlet and outlet pipes and the valve are subject to liquids or gases at significant pressures and flowrates, while the exterior is typically exposed to air at prevailing atmospheric conditions. To block fluid flow and prevent leakage, one or more seals or sealing assemblies are disposed at each sealing interface. These are depicted schematically in FIG. 1. For example, a sealing assembly generically referred to by the reference letter "S" is disposed at the interface between the inlet passage 18 and the ball 14. Another sealing assembly S is disposed at the interface between the outlet passage 22 and the ball 14. Another sealing assembly S is disposed at the interface between the stem 26 and the housing 12. Another sealing assembly S is disposed at the interface between the inlet pipe 30 and the inlet passage 18. Finally, another sealing assembly S is disposed at the interface between the outlet passage 22 and the outlet pipe 34.

The functional principles of conformable seals described above are applicable to numerous physical configurations, several exemplary embodiments of which will be described in more detail below, with reference to the drawings wherein identical reference numerals denote the same elements throughout the various views. It will be understood that the exemplary embodiments below may be used as the sealing assemblies S described above.

Figure 2:
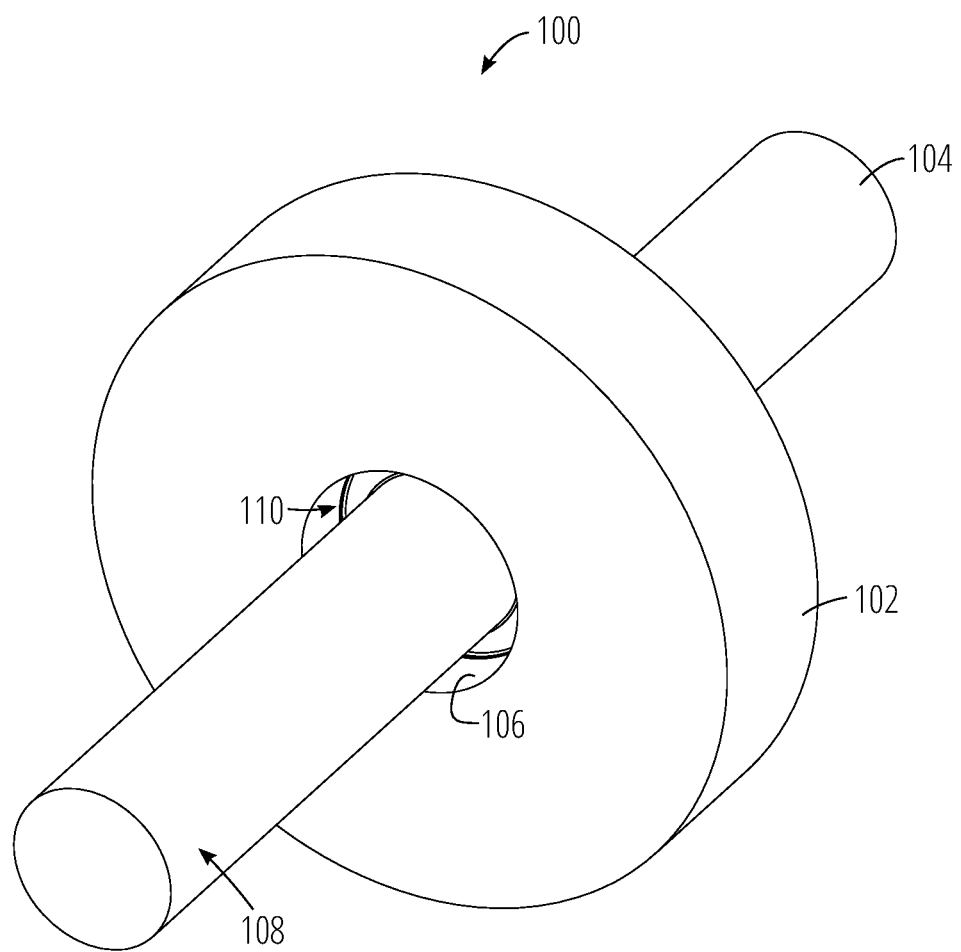
FIG. 2 is a perspective view of a seal assembly constructed in accordance with an aspect of the present invention.
Figure 3:
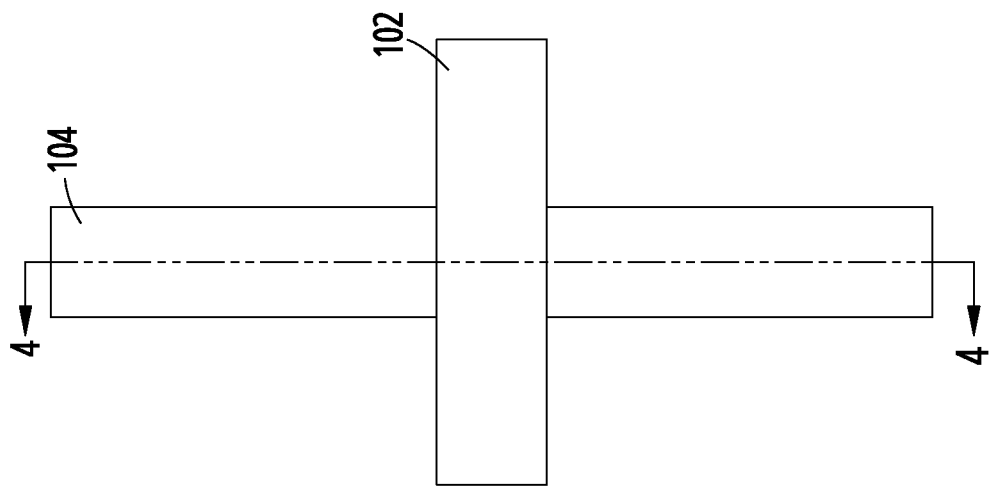
FIG. 3 is a side view of the seal assembly of FIG. 2.
Figure 4:
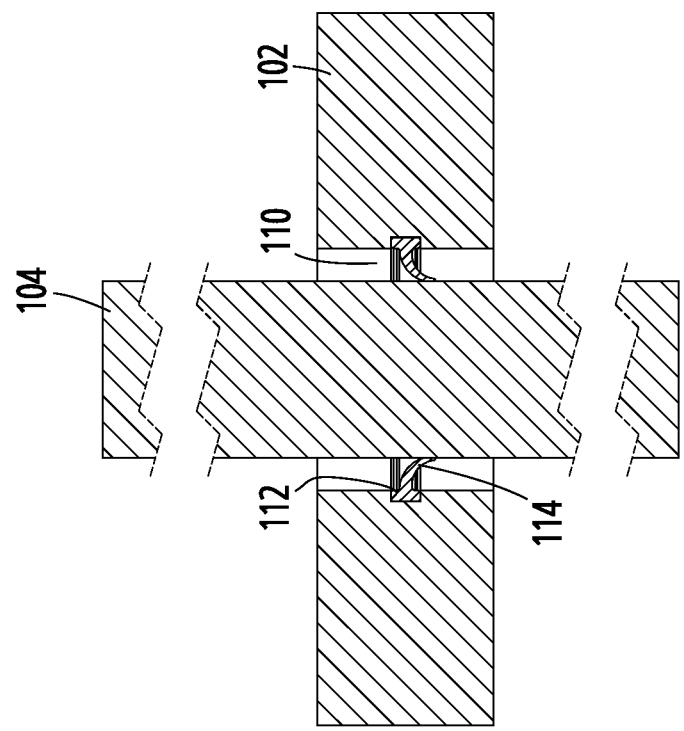
FIG. 4 is a cross-sectional view of the seal assembly of FIG. 3.

FIGS. 2-4 illustrate an apparatus 100 comprising first and second members 102 and 104. In the illustrated example the first member 102 is an element with a bore 106 (e.g. a cylindrical bore in this case) defining a concave interior surface, and the second member 104 is a shaft having a convex exterior contact surface 108, passing through the bore 106. This example would be representative of the housing of an industrial valve and the shaft or stem of the valve (where the valve stem can rotate and/or translate relative to the housing), for example the housing 12 and stem 26 shown in FIG. 1). The second member 104 can rotate about and translate parallel to its own longitudinal central axis. A seal 110 is disposed between the bore 106 and the contact surface 108. The seal 110 could optionally be integral to the first member 102.

The seal 110 includes an annular, ring-like body 112 with an annular lip 114 extending in a generally radially inward direction from the body 112. The lip 114 is constructed from a rigid material as described above, with a contact surface 116 that is wear-resistant as described above (see FIG. 5). In the configuration shown in FIG. 5, the contact surface 116 is convex. The cross-sectional profile of the contact surface 116 may be flat or curved as necessary to suit a particular application. When viewed in half-sectional profile, the lip 114 is arcuate, such that contact between the lip 114 and the second member 104 tends to cause bending deflection of the lip 114.

The second member 104 is also made from a rigid material. Contact surface 108 is wear-resistant as described above. When assembled, the contact surfaces 108 and 116 bear directly against each other along a continuous closed perimeter, so as to seal against fluid leakage between the first and second members 102 and 104 while allowing relative sliding motion between the surfaces (and thus, relative sliding or rotation between the first and second members 102 and 104).

Optionally, the lip 114 may be sized relative to the second member 104 such that there is some degree of static deflection or "preload" in the lip when the first and second members 102 and 104 are statically assembled.

Nominally the contact surfaces 108 and 116 define a "ring" or "band" contact interface therebetween. In practice it is impossible to achieve surface profiles completely free of minor imperfections and variations. If the second member 104 and the seal 110 were both completely rigid, this would cause high Hertzian contact stresses and rapid wear. Accordingly, an important feature of the illustrated assembly 100 is that the lip 114 and thus the contact surface 116 of the seal 110 is conformable to the opposing contact surface 108, as described above.

Figure 5:
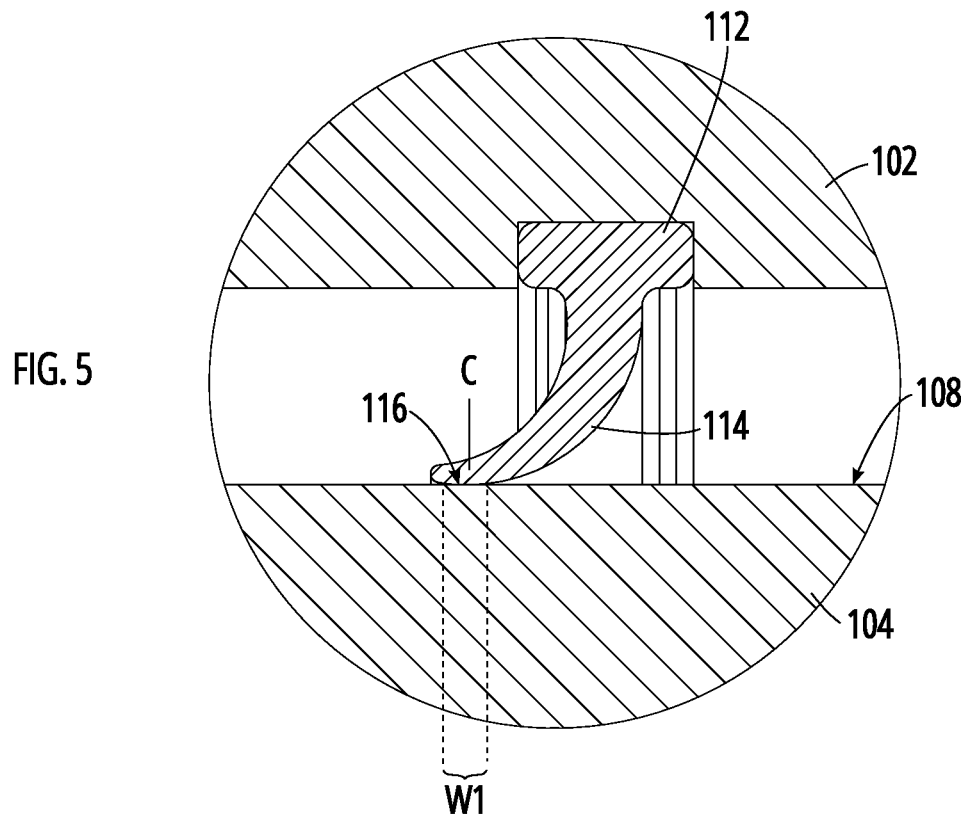
FIG. 5 is a cross-sectional view of a seal in a first condition.
Figure 6:
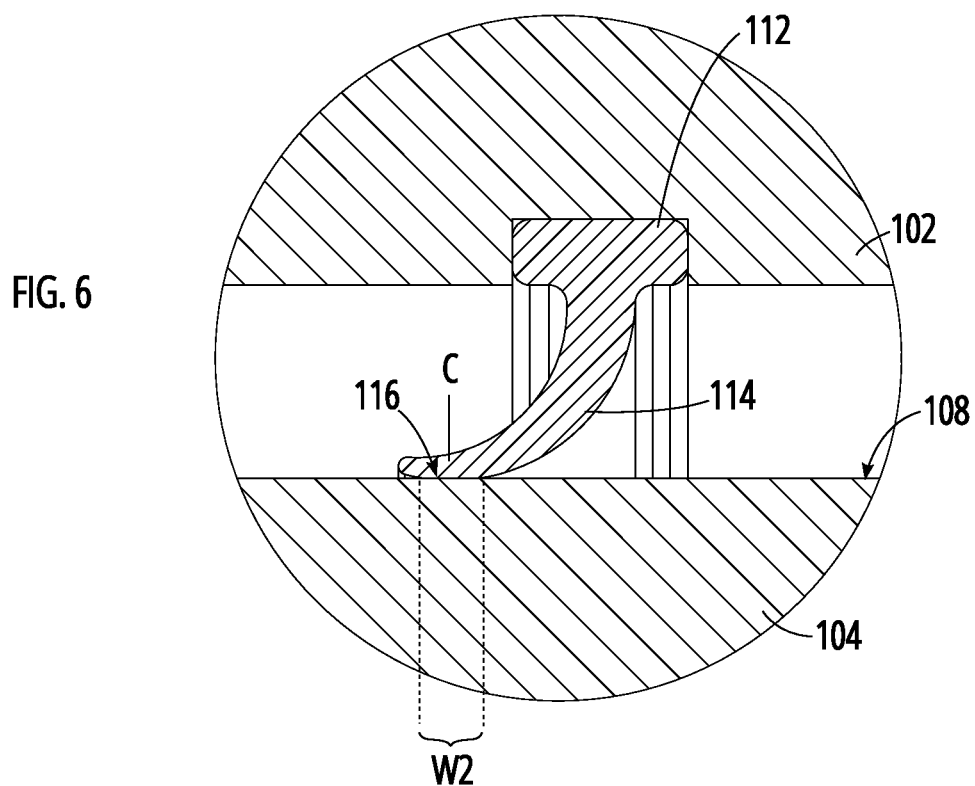
FIG. 6 is a cross-sectional view of a seal in a second condition.
Figure 8:
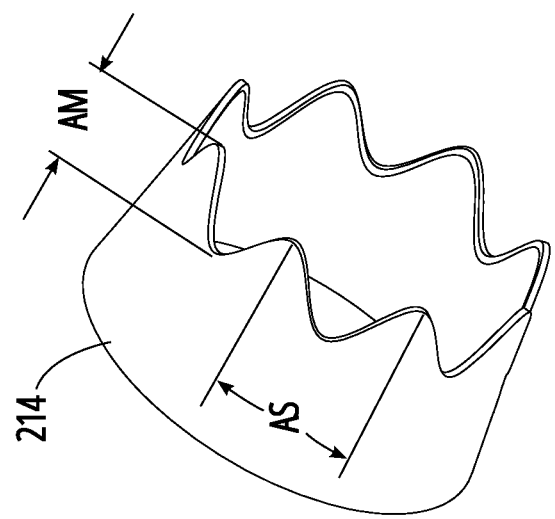
FIG. 8 is an enlarged view of a portion of FIG. 7.

FIG. 5 shows a cross-sectional view of the lip in an initial condition. It can be seen that the contact surface 116 of the lip 114 bears against the contact surface 108 of the second member 104, creating a contact region or band of first width "W1". FIG. 6 shows the lip in a position after wear, resulting in a substantially increased contact surface area width "W2" between the contact surfaces 108 and 116. The lip 114 may be shaped such that a midline "C" of the contact band or region remains essentially stationary during the changes in the size of the contact region or band. As described above, the lip 114 can conform to the imperfect contact surface 108 and deflect in an irregular shape. The lip is sized to achieve this controlled deflection as described above.

Figure 7:
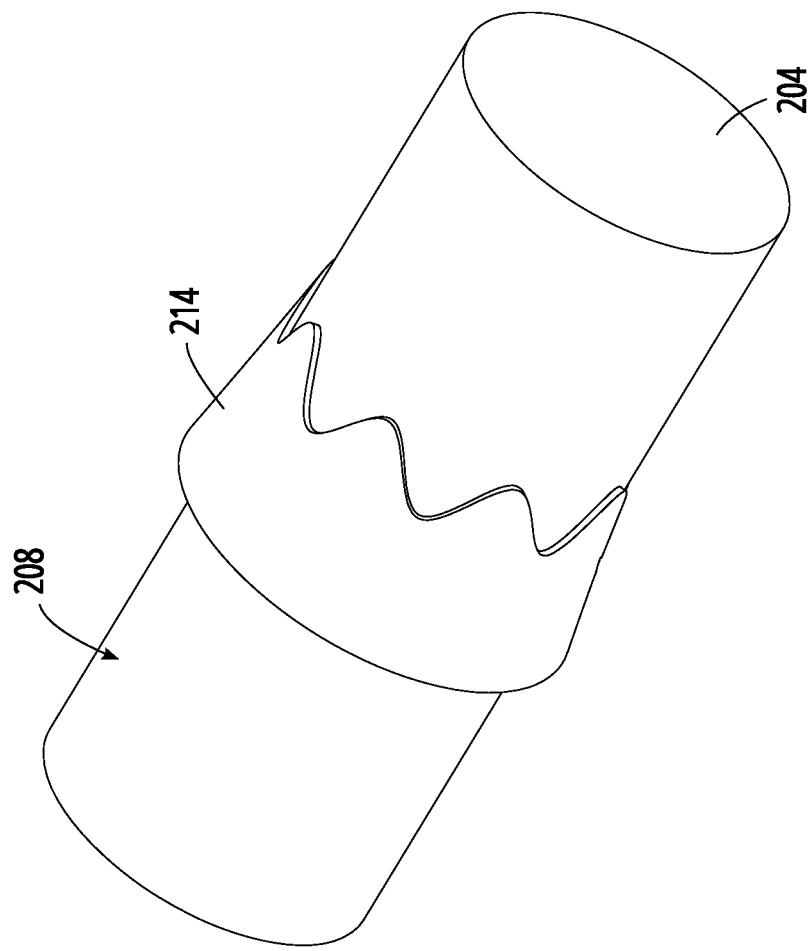
FIG. 7 is a perspective view of a variation of the seal assembly of FIG. 2.
Figure 40:
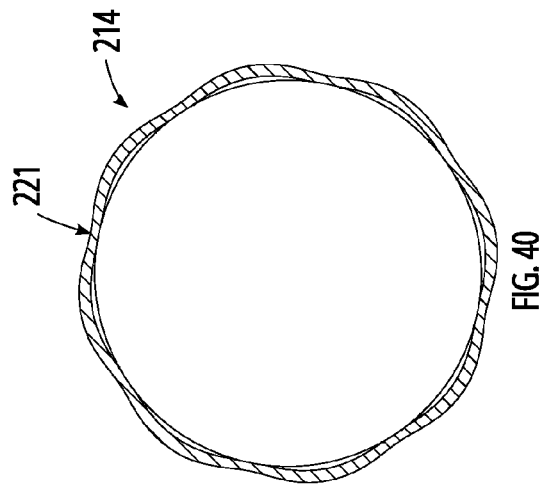
FIG. 40 is a view taken along lines 40-40 of FIG. 39.
Figure 39:
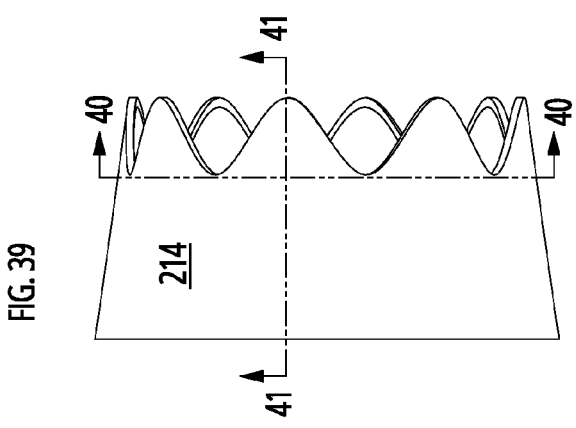
FIG. 39 is a side view of the seal assembly shown in FIGS. 7 and 8.
Figure 41:
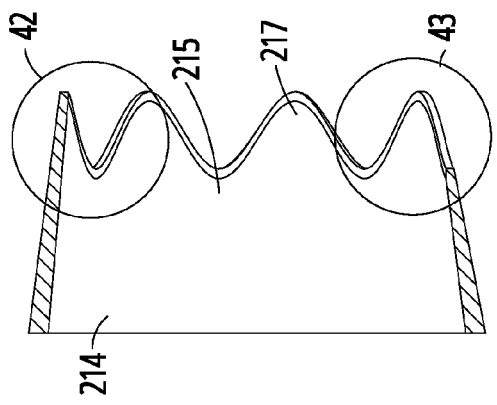
FIG. 41 is a view taken along lines 41-41 of FIG. 39.
Figure 42:
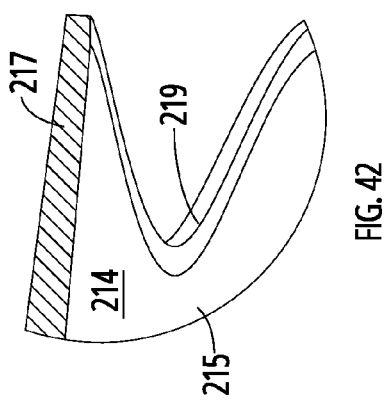
FIG. 42 is an enlarged view of a portion of FIG. 41.
Figure 43:
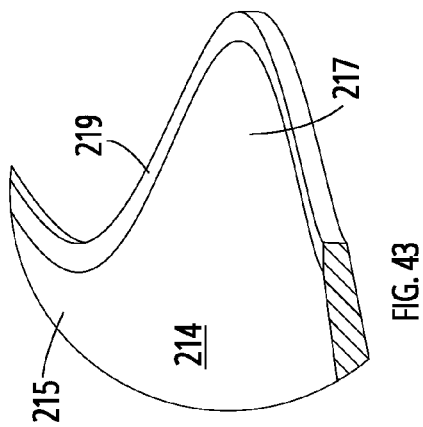
FIG. 43 is an enlarged view of a portion of FIG. 41.

Optionally, the lip 114 may terminate in a shape that is not an intersection with a plane. For example, FIG. 7 shows a lip 214 engaged with the contact surface 208 of an inner member 204. The distal end of the lip 214 has a "scalloped" or "oscillating" shape, with alternate axially shorter and longer portions 215 and 217, respectively, similar to a sinusoidal curve (see FIG. 41). This type of configuration allows the lip 214 to have a variable hoop stress. Sealing performance of the lip can be tailored to suite a particular application by varying the oscillation spacing "AS", amplitude "AM", and/or lip seal profile geometry. FIGS. 39-43 illustrate the lip 214 in more detail. In particular, the lip 214 includes a contact land 219 which is configured to uniformly contact the opposed contact surface (i.e. of the shaft). The contact land 219 extends continuously across the shorter and longer portions 215 and 217. As shown in FIG. 40, the lip 214 incorporates radial "dips" or "valleys" 221 at the circumferential locations of the shorter portions 215. As seen in FIGS. 42 and 43, the contact land 219 is disposed at an acute angle relative to the adjacent portion of the inner surface of the lip 214. Stated another way, the contact land 219 is a surface of revolution about a central axis, even though the overall geometry of the lip 214 might not be a body of revolution. The contact land 219 could be straight or curved when viewed in longitudinal cross-section.

Figure 9:
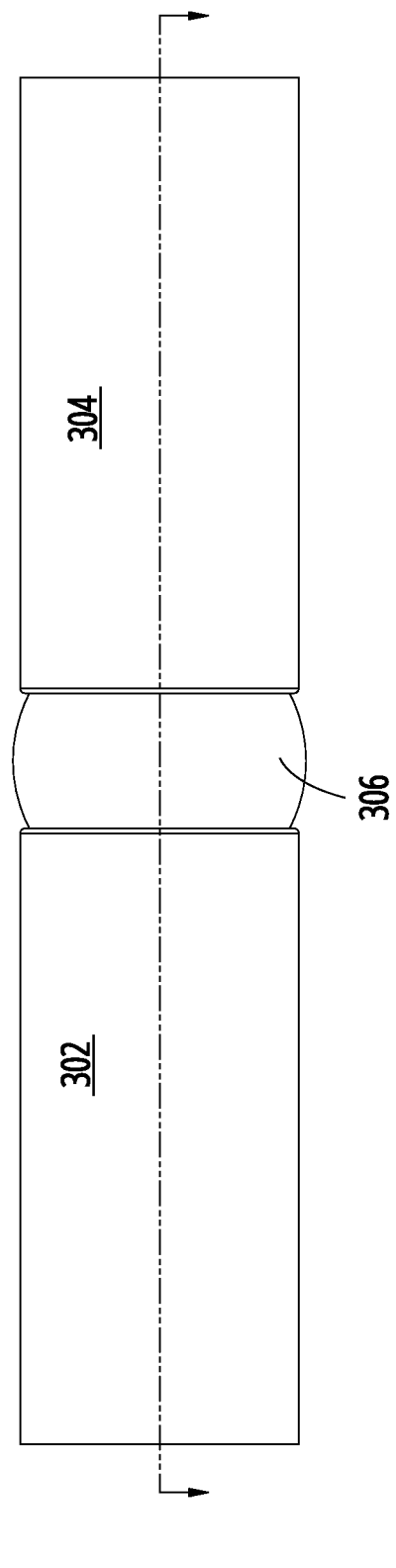
FIG. 9 is a side view of an alternative seal assembly.
Figure 11:
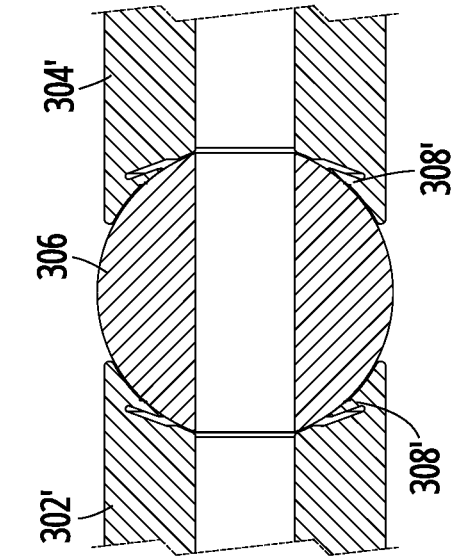
FIG. 11 is a cross-sectional view of the seal assembly of FIG. 9, showing a second variation.
Figure 10:
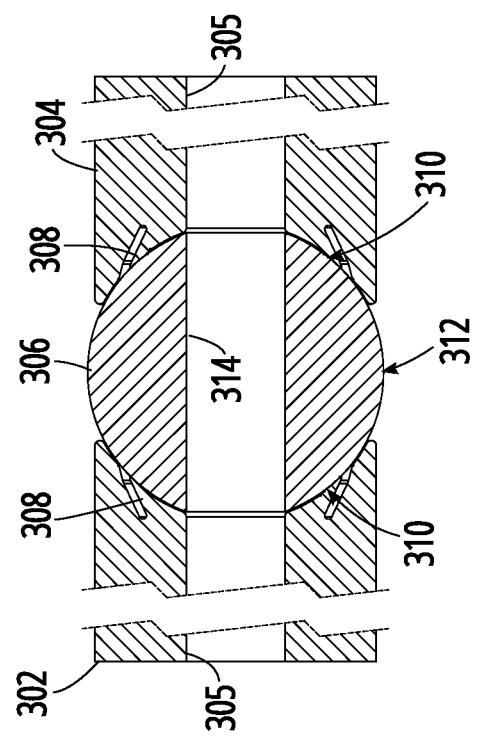
FIG. 10 is a cross-sectional view of the seal assembly of FIG. 9, showing a first variation.

FIGS. 9-11 illustrate an alternative assembly 300 including a first tube section 302 joined to a second tube section 304 by a spherical ball 306. In the variation shown in FIG. 10, the first tube section 302 has a bore 305 passing therethrough, and incorporates an annular lip 308 at the end adjacent the ball 306. The lip 308 may be separate or integral to the tube section 302. It is configured as a conformal seal element as described using the general principles described above, and is made of a rigid material with a contact surface 310 that is wear-resistant as described above. In the illustrated example, the lip 308 extends in a generally axial direction, and bears against a contact surface 312 of the ball 306, which has a bore 314 passing through it. The second tube section 304 is identical to the first tube section 302 and includes a bore 305 and a conformal lip 308 with a contact surface 310 bearing against the contact surface 312 of the ball 306. When assembled, the ball 306 and tube sections 302 and 304 permit flow through the joined bores 305 and 314 while allowing pivoting and/or rotation of the tube sections 302 and 304 relative to the ball 306.

FIG. 11 shows a variation of the assembly 300 in which tube sections 302' and 304' have conformal lips 308' that extend in a generally radial direction. It is also possible that the tube sections could include plain concave seats (not shown) and that the ball 306 would include an annular conformal lip (not shown) mating with each of the seats of the tube sections.

Figure 12:
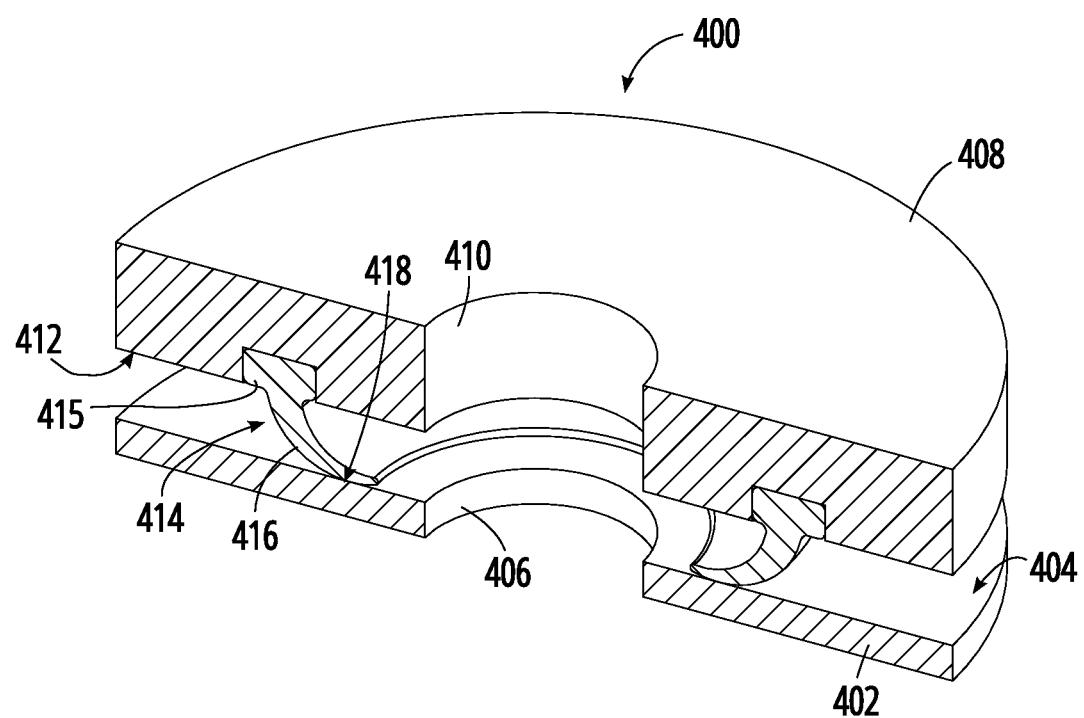
FIG. 12 is a sectioned perspective view of an alternative seal assembly.
Figure 21:
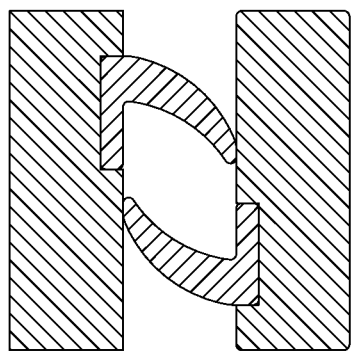
FIG. 21 is a cross-sectional view of an open seal lip combination.
Figure 20:
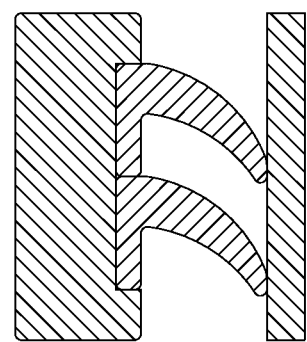
FIG. 20 is a cross-sectional view of an open seal lip combination.
Figure 23:
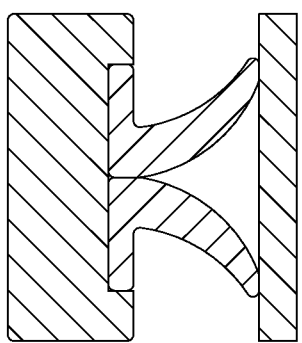
FIG. 23 is a cross-sectional view of an open seal lip combination.
Figure 19:
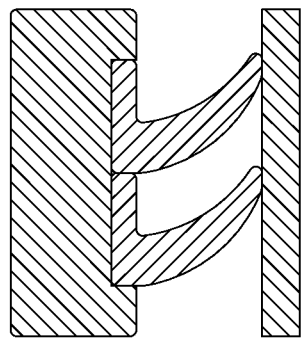
FIG. 19 is a cross-sectional view of an open seal lip combination.
Figure 22:
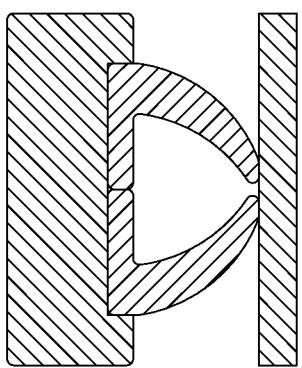
FIG. 22 is a cross-sectional view of an open seal lip combination.
Figure 24:
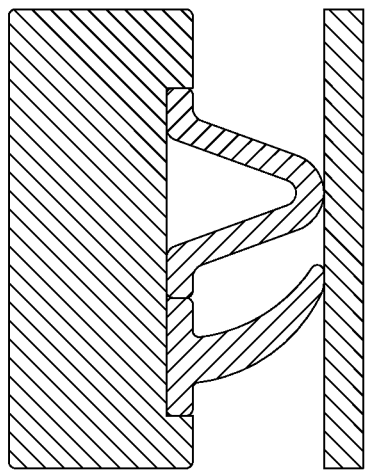
FIG. 24 is a cross-sectional view of a combination of open and closed seal lips.
Figure 25:
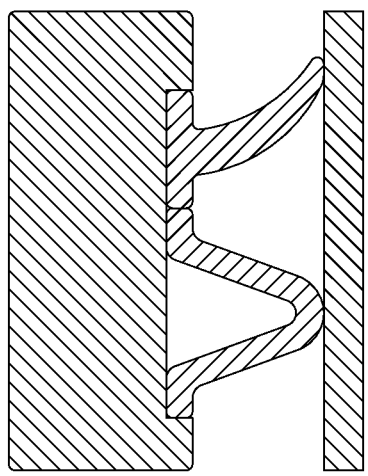
FIG. 25 is a cross-sectional view of a combination of open and closed seal lips.
Figure 26:
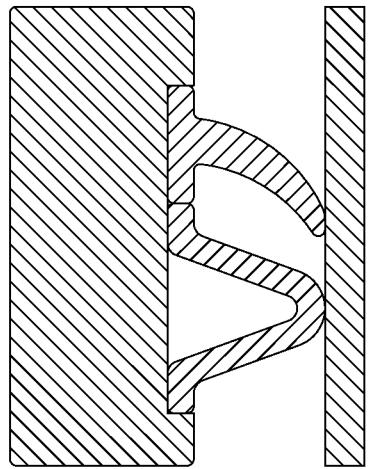
FIG. 26 is a cross-sectional view of a combination of open and closed seal lips.
Figure 27:
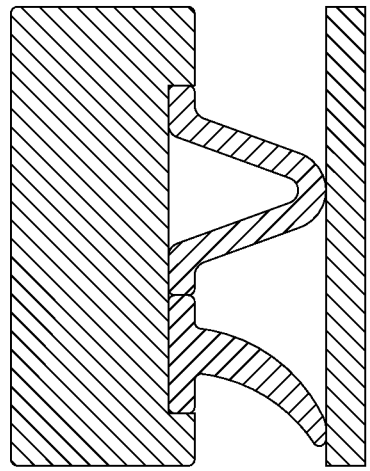
FIG. 27 is a cross-sectional view of a combination of open and closed seal lips.

FIG. 12 illustrates an alternative assembly 400 in which the seal is positioned between two members having facing flat surfaces. A first member 402 includes a flat face defining a contact surface 404 that is wear-resistant as described above, and a bore 406 passing therethrough. A second member 408 has a bore 410 passing therethrough and a face 412 incorporating an annular seal 414 with a body 415 and an annular lip 416 defining a contact surface 418 that is wear-resistant as described above. The lip 416 is conformal as described above. In the variation shown in FIG. 12, the seal 414 has a single lip 416 extending radially inward, which may be referred to as an "open" shape.

FIGS. 13-15 illustrate another alternative assembly 500 which is variation of the assembly 400 shown in FIG. 12. The assembly 500 includes a first member 502 incorporating an annular seal 504 having a conformal lip 506 defining a contact surface 508 that is wear-resistant, and a second member 510 with a contact surface 512 that is wear-resistant as described above. When viewed in half-section, the lip 506 has a sectional shaped which is generally U-shaped and convex. This may be referred to as a "closed" shape. FIG. 14 shows the width "W3" of the contact surface 508 under a first loading condition (or during initial assembly). FIG. 15 shows the increased width "W4" of the contact surface 508 under a greater load and/or after wear has taken place.

FIGS. 16-18 depict different potential variations of "closed" seal lip cross-sectional shapes, showing variations in curvatures, number of discrete faces, material thickness, and so forth, that may be employed to adapt the closed seal lip to various applications.

FIGS. 19-23 depict different combinations of "open" seal lip shapes, showing variations in the placement, "hand" or direction, and orientation of pairs of seal lips that may be employed to adapt the open seal lip to various applications.

FIGS. 24-27 depict different combinations using pairs of open and closed seal lips that may be employed to suit various applications.

Figure 28:
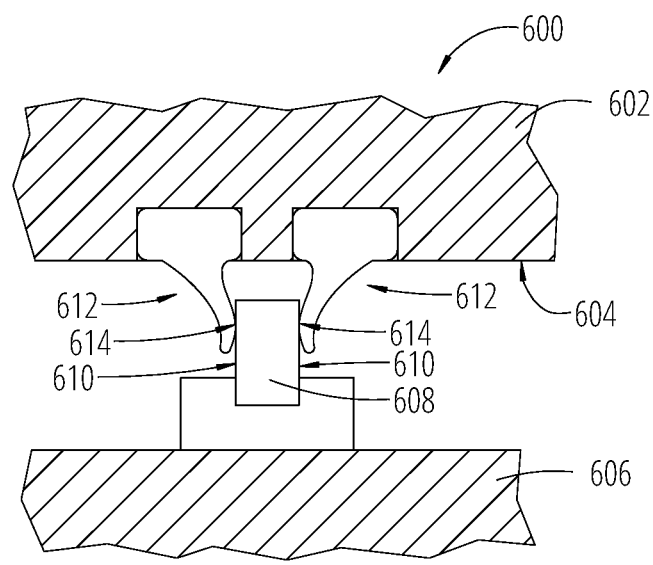
FIG. 28 is a cross-sectional view of an alternative seal assembly.
Figure 29:
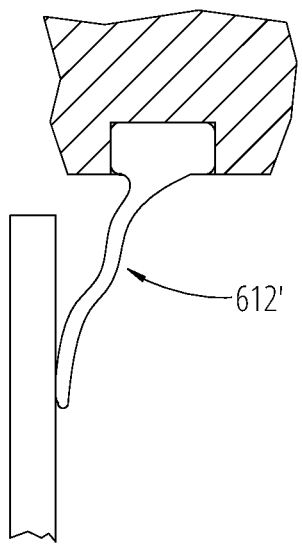
FIG. 29 is a cross-sectional view showing an alternate seal configuration.
Figure 30:
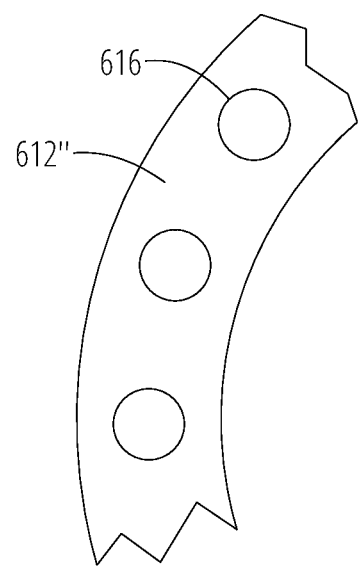
FIG. 30 is a plan view showing a portion of a seal lip.

FIGS. 28-30 illustrate an alternative seal assembly 600 comprising first and second members 602 and 606. In the illustrated example the first member 602 is an annular structure with a bore 604 having a concave interior surface formed therein, and the second member 606 is a shaft having a convex exterior surface, passing through the bore 604. The bore 604 and the second member 606 are surfaces of revolution and/or generation about a central axis "A". The second member 606 includes an annular flange 608 extending radially outward, with opposed contact surfaces 610 that are wear-resistant as described above. The first and second members 602 and 606 may be stationary or moveable relative to each other.

The first member 602 includes a pair of axially spaced-apart annular seal lips 612 made of rigid material as described above. Each seal lip 612 defines a contact surface 614 that is wear-resistant as described above. At least one of the contact surfaces 610 and 614 is conformable as described above. Each seal lip 612 bears against one of the contact surfaces 610 of the flange 608.

FIG. 29 illustrates a seal lip 612' having multiple bends in its shape. This type of shaping may be useful to facilitate resilience, circumferential contact, and load dynamics. In addition to or as an alternative to such shaping, the seal lip may incorporate one or more dimples or variable-thickness sections for the same purpose. As an example, FIG. 30 illustrates a seal lip 612" having multiple dimples 616 formed therein.

Figure 31:
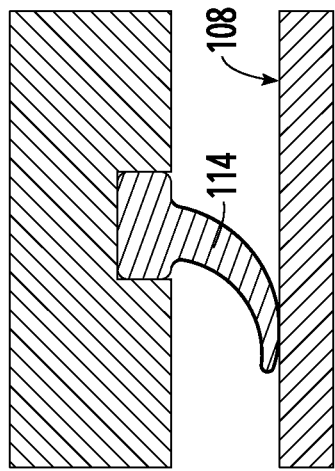
FIG. 31 is a cross-sectional view of a seal assembly.
Figure 34:
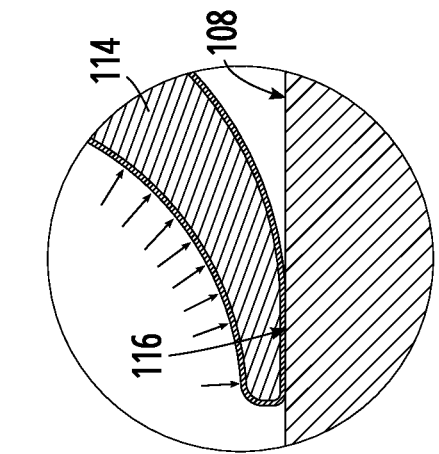
FIG. 34 is an enlarged view of a seal seen in FIG. 31, showing a variant configuration of the seal lip.
Figure 33:
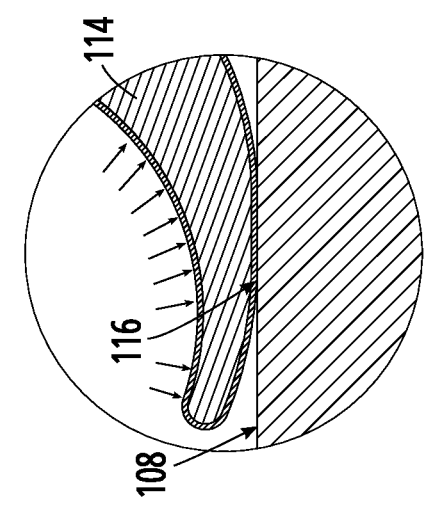
FIG. 33 is an enlarged view of a seal seen in FIG. 31, in a second condition.
Figure 32:
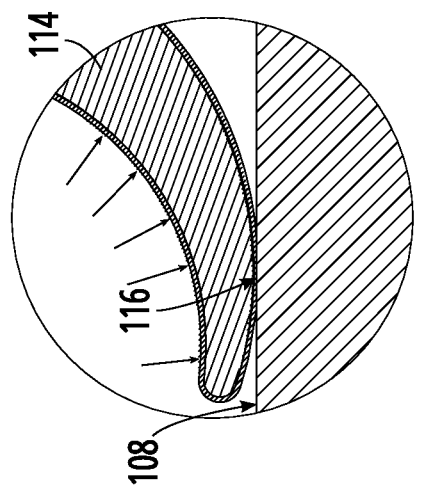
FIG. 32 is an enlarged view of a seal seen in FIG. 31, in a first condition.

Any of the seals described above may be configured such that part geometry, yield, deflection, and other characteristics work in conjunction with applied fluid pressure to provide the desired contact and sealing performance. For example, considering the seal lip 114 (shown generally in FIG. 31), in FIG. 32 relatively low fluid pressure is prevalent on the seal lip 114 (shown by the arrows). The contact surface 116 deforms a certain amount. When a higher fluid pressure is prevalent as shown by the arrows in FIG. 33, the contact surface 116 deforms to a greater amount, increasing the area of the contact region or band, "clamping" the contact surface 116 against the contact surface 108 and assuring that leakage does not occur. Optionally, as seen in FIG. 34, the seal lip 114 may be shaped so that under pressure, its distal end or perimeter deflects towards and lies completely on the opposing contact surface 108 and does not curve away from the opposing contact surface 108. This ensures that any fluid pressure acting on the exterior of the lip 114 (shown by the arrows) will not act in a direction tending to "lift" the lip 114 away from the contact surface 108. Another way of stating this relationship is that pressure forces on the lip 114 are blocked or prevented from acting against sealing forces on the lip 114.

Figure 38:
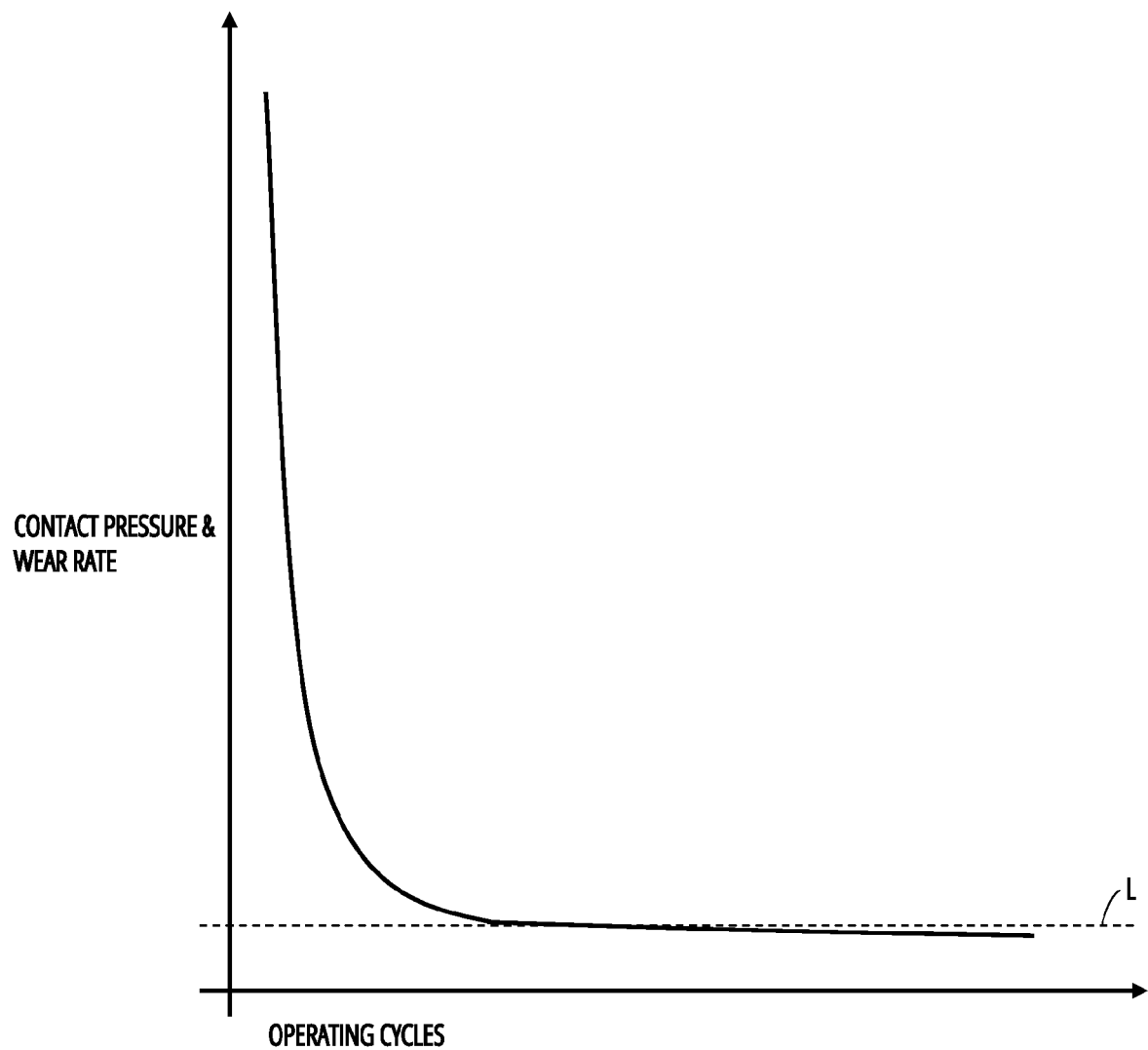
FIG. 38 is a graph showing contact pressure and wear rate of the seal compared to the number of operating cycles.

Optionally, any of the seals described above may be designed in conjunction with the opposing contact surface to create a wear characteristic that is constantly diminishing (similar to an asymptotic characteristic). For example, considering the seal lip 416 (shown generally in FIG. 35), in FIG. 36 the initial assembled condition is shown. When assembled and placed under load, the annular interface between each of the contact surfaces 418 and 404 will have a characteristic width denoted "W5", (effectively creating a contact band). The initial dimensions of the lip 416 are selected such that, even using wear-resistant surfaces or coatings, some wear takes place during an initial wear-in period of movement cycles. As a result, the contact band width increases during the initial wear-in period to a second, larger value "W6" (seen in FIG. 37). This increases contact area and therefore decreases contact stress for a given load. After the initial wear-in period (which could occur before the assembly is placed into its end use), the contact band reaches a post wear-in width at which the contact stress is below a selected limit, below which the rate of wear in the contacting surfaces approaches a very low number or zero, consistent with a long life of the seal assembly 400. FIG. 38 illustrates this wear characteristic, with the limit "L" depicted as a horizontal line.

It is noted that the increase in contact band or contact region area (e.g. as shown in FIGS. 32 to 33 and FIGS. 36 to 37) can occur as a result of changes in loading or from initial wear-in, or from a combination of both loading and wear-in.

The configuration of the lip 416 is important in developing the constantly diminishing wear characteristics described above. In particular, the lip 416 may be sized and shaped so that deflections of the contact surface 418 under varying loads is always essentially normal to its tangent point on the opposing contact surface 404, as the lip 416 is loaded and unloaded. This ensures that the midline "C" of the contact region or band remains constant and that the contact bands remain substantially uniform around the entire periphery of the joint 400.

As noted above, known coatings such as titanium nitride, chrome plating, carbon thin films, and/or diamond-like carbon coatings may be used to impart wear resistance or augment the wear resistance of any of the contact surfaces described above. To the same end, it may be desirable to surface treat either or both interfaces of any of the above-described contact surfaces with a laser, shot peen, burnishing, or water shock process, to impart residual compressive stresses and reduce wear. The benefit could be as much from surface annealing and microstructure and microfracture elimination as smoothing itself.

The foregoing has described a seal assembly with wear-resistant properties and conformal geometries. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A seal apparatus, comprising:
   (a) first and second machine elements cooperatively defining a sealing interface between two zones which are subject in use to different fluid pressures, a boundary of which lies between the two elements;
   (b) a seal of monolithic rigid metal or ceramic material carried by the first machine element, the seal having a body rigidly connected to the first machine element and an annular lip extending away from the body and defining a first contact surface, the seal configured so as to permit bending deflection of the lip towards the first machine element;
   (c) a second contact surface comprising a rigid metal or ceramic material, defined by the second machine element;
   (d) wherein both contact surfaces are wear resistant, and wherein the first and second contact surfaces bear directly against each other along a continuous closed perimeter, so as to seal against fluid leakage between the first and second zones, while allowing relative sliding motion between the first and second contact surfaces;
   (e) wherein the seal is shaped and sized so as to allow the lip to deform elastically and permit the first contact surface to conform in an irregular shape to the second contact surface along a contact band;
   (f) wherein a selected one of the first and second contact surfaces has a wear-resistant coating disposed thereon; and
   (g) wherein the first and second contact surfaces are configured to produce an asymptotic wear characteristic in the contact band when in use.

2. The apparatus of claim 1, wherein the seal is integral to the first member.

3. The apparatus of claim 1 wherein the first member includes a hole through which the second member passes, the first contact surface is concave, and the second contact surface is convex.

4. The apparatus of claim 1 wherein the second contact surface is a flat plane.

5. The apparatus of claim 1 wherein the seal is annular and has a scalloped shape.

6. The apparatus of claim 1 wherein the lip has an open, curved cross-sectional shape.

7. The apparatus of claim 1 wherein the lip has a closed, curved cross-sectional shape.

8. The apparatus of claim 1, where the seal is sized so as to permit elastic deflection of the seal while limiting stresses in the seal to less than the endurance limit of the material, when a predetermined load is applied to the apparatus.

9. The apparatus of claim 1 wherein the annular lip is configured so as to clamp the first contact surface against the second contact surface in response to fluid pressure in the first zone.

10. The apparatus of claim 1 where the lip is configured to produce a varying area contact region between the first and second contact surfaces in response to changes in mechanical and/or fluid pressure acting on the apparatus.

11. The apparatus of claim 1 where the lip is configured to define a contact region between the first and second contact surfaces, such that a midline of the contact region remains stationary in response to changes in mechanical and/or fluid pressure on the apparatus.

12. The apparatus of claim 1 where the lip is configured so as to block pressure loads on the seal from acting against sealing forces acting on the lip.

13. The apparatus of claim 1 wherein the first member includes a concave seat which incorporates the seal, and the second contact surface defined by the second member is convex.

14. The apparatus of claim 1 wherein the seal is made from a material more rigid than both elastomers and polymers.

15. The apparatus of claim 1 wherein two or more seals are provided, each seal carried by one of the machine elements and contacting the contact surface of the other machine element.

* * * * *